S. B. FLEISHER.

Devices for Holding Coils of Braid and Similar Articles.

No. 9,019. Reissued Jan. 6, 1880.

Witnesses
E. E. Masson
I. J. Masson

Inventor
Simon B. Fleisher
by Lewis Abrahams
attorney

UNITED STATES PATENT OFFICE.

SIMON B. FLEISHER, OF PHILADELPHIA, PENNSYLVANIA.

DEVICE FOR HOLDING COILS OF BRAID AND SIMILAR ARTICLES.

SPECIFICATION forming part of Reissued Letters Patent No. 9,019, dated January 6, 1880.

Original No. 205,258, dated June 25, 1878. Application for Reissue filed December 4, 1879.

DIVISION B.

*To all whom it may concern:*

Be it known that I, SIMON B. FLEISHER, of Philadelphia, in the county of Philadelphia and State of Pennsylvania, have invented a new and useful Improvement in Packing and Putting up Braid for the Market, which improvement is fully set forth in the following specification and accompanying drawings, in which—

Figure 1:
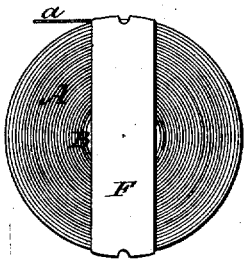
Figure 2:
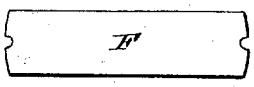
Figure 3:
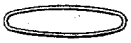
Figure 4:
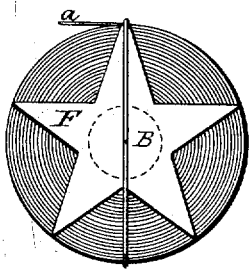
Figure 5:
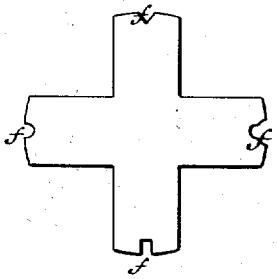
Figure 6:
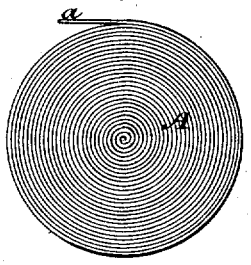
Figure 7:
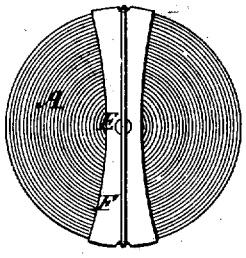

Figure 1 is a side view of a roll of braid having side supporting-strips. Fig. 2 is a view of a side supporting-strip detached. Fig. 3 is a view of band. Fig. 4 is a modification of Fig. 1 with band attached. Fig. 5 is a modification of Fig. 2. Fig. 6 is a side view of a coil of braid rolled up on itself, without any central core or bobbin. Fig. 7 is the same as Fig. 6, with the addition of side supporting-strip and a central pivot-pin.

Similar letters of reference designate the several parts.

The object of my invention is to furnish a convenient device, as hereinafter described, for putting up, holding, and fastening braid and similar articles in coils, so that when exposed for sale or handled for use it will not unwind by itself or be liable to be displaced laterally.

The braid is wound round a central bobbin, B, forming a continuous coil, A, one end commencing at the bobbin B, the other end, *a*, terminating at the periphery; or the central spool, B, may be dispensed with in any modification, and the braid be wound around itself, as shown in Figs. 6 and 7, and then be transfixed with a central pin, E.

Against the flat sides of the coil A, I place supporting-strips F, having at either end small notches *f*. These notches may be semicircular, triangular, straight, or of any desired configuration.

I illustrate four modified varieties on Fig. 5. The side strips are made of pasteboard or any material having required stiffness, and are fastened to the bobbin B with adhesive material; or, when the bobbin is dispensed with, are connected together with a stud-headed pin, E, Fig. 7. After the braid is wound into a coil, A, and one of the supporting-strips F is placed on either side, a band, preferably elastic, is passed over the coil, outside of the strips F, and is kept in position by being dropped into the notches *f*. The terminal point *a* of the braid is thus confined and kept flat against the periphery of the coil, keeping it from unwinding; or the side supporting-strips may be extended over the periphery and the band dispensed with, thus preventing lateral displacement.

I do not desire to limit myself to a straight strip with parallel side edges, as shown in Figs. 1 and 2, as it is manifest that the configuration can be changed, as taste or convenience may dictate, without departing from the essential features of my invention. For some purposes I make radial or diverging arms to the strips F. Figs. 4 and 5 show some forms of modification, illustrating side supporting-strips of this character.

As before recited, the braid, instead of being wound around a central bobbin, may be wound upon itself, as shown on Fig. 6, forming one continuous braid-coil, and then supporting-strips can be placed on either side and be kept in position by means of a central pin, E, being driven through and through, the pin being fastened with stud-heads, as shown on Fig. 7.

What I claim is—

A device for putting up flat coils of braid, consisting of supporting side strips F, with or without diverging radial arms, having notches *f*, in combination with an exterior surrounding band and central bobbin or pin, all adapted to hold the braid in place, substantially as described.

In testimony that I claim the foregoing as my invention I place my signature in the city of Philadelphia this 18th day of November, 1879.

SIMON B. FLEISHER.

Witnesses:

BENJ. F. TEILER,

CHAS. A. GALLAGHER.